United States Patent  
Kanemaru et al.

(10) Patent No.: US 7,693,398 B2
(45) Date of Patent: Apr. 6, 2010

(54) DIGITAL INFORMATION REPRODUCING APPARATUS AND METHOD (75) Inventors: Takashi Kanemaru, Yokohama (JP); Sadao Tsuruga, Yokohama (JP)

(73) Assignee: Hitachi, Ltd., Tokyo (JP)

(*) Notice: Subject to any disclaimer, the term of this patent is extended or adjusted under 35 U.S.C. 154(b) by 1010 days.

(21) Appl. No.: 11/074,015

(22) Filed: Mar. 8, 2005

(65) Prior Publication Data
US 2005/0265159 A1 Dec. 1, 2005

(30) Foreign Application Priority Data
Jun. 1, 2004 (JP) ............... 2004-162710

(51) Int. Cl.
H04N 7/00 (2006.01)
H04N 5/50 (2006.01)
H04N 5/91 (2006.01)
H04N 5/95 (2006.01)
H04N 5/445 (2006.01)
H04N 7/26 (2006.01)
H04N 7/64 (2006.01)
G06F 17/00 (2006.01)
G10L 11/06 (2006.01)
G10L 19/14 (2006.01)
G10L 21/04 (2006.01)
G11B 5/09 (2006.01)
G11B 20/00 (2006.01)

(52) U.S. Cl. ............... 386/96; 386/90; 386/99; 386/108; 386/112; 386/113; 386/116; 386/122; 386/123; 348/731; 369/47.1; 369/47.19; 369/59.1; 704/208; 704/211; 704/214; 704/503; 715/203; 725/38

(58) Field of Classification Search ............ 386/E9.013, 386/E9.017, 90, 99, 108, 112, 113, 116, 122, 386/123; 341/143, 144; 348/731, E5.006, 348/E7.071, E7.024; 375/E7.093, E7.094, 375/E7.211, E7.254, E7.271, E7.023; 715/203; 725/38; 704/208, 211, 214, 503, E21.017; G9B/20.001, 20.014, 27.002
See application file for complete search history.

(56) References Cited

U.S. PATENT DOCUMENTS
5,594,660 A * 1/1997 Sung et al. .......... 715/203
(Continued)

FOREIGN PATENT DOCUMENTS
EP 0 735 782 A2 3/1996
(Continued)

OTHER PUBLICATIONS
Japanese Office Action, issued in Japanese Patent Application No. 2004-162710, dated on Nov. 8, 2007.
(Continued)

Primary Examiner—Thai Tran
Assistant Examiner—Syed Y Hasan
(74) Attorney, Agent, or Firm—McDermott Will & Emery LLP (57) ABSTRACT High audibility output is realized when audio output is provided in special playback. In special playback with audio output, skip/repeat control is done so that decoding and outputting of the audio data is periodically repeated/skipped during part of one frame. The output level may be corrected so as to emphasize appropriate frequency components. This realizes good audio output. In addition, the skip/repeat control and output level correcting methods are changed according to characteristics of the audio data to be reproduced. Also, this realizes good audio output.

17 Claims, 7 Drawing Sheets

U.S. PATENT DOCUMENTS

| | | | |
|---|---|---|---|
| 5,781,696 A | | 7/1998 | Oh et al. |
| 5,809,454 A | * | 9/1998 | Okada et al. ............... 704/214 |
| 5,991,725 A | | 11/1999 | Asghar et al. |
| 6,026,067 A | | 2/2000 | Tanaka |
| 6,049,766 A | | 4/2000 | Laroche |
| 6,292,454 B1 | | 9/2001 | Hu |
| 6,304,200 B1 | * | 10/2001 | Masuda ....................... 341/144 |
| 7,274,862 B2 | * | 9/2007 | Komori ........................ 386/99 |
| 2004/0205218 A1 | * | 10/2004 | Nakaoka et al. ............. 709/231 |
| 2005/0183133 A1 | * | 8/2005 | Kelly .......................... 725/120 |

FOREIGN PATENT DOCUMENTS

| | | |
|---|---|---|
| EP | 0 726 560 B1 | 6/2001 |
| EP | 1 515 310 A1 | 3/2005 |
| JP | 06-162663 | 6/1994 |
| JP | 08-331511 | 12/1996 |
| JP | 10-187188 | 7/1998 |
| JP | 11-018057 | 1/1999 |
| JP | 2002-084241 | 3/2002 |
| JP | 2002-278597 | 9/2002 |
| JP | 2002-354419 | 12/2002 |
| JP | 2003-289346 | 10/2003 |
| WO | WO 98/44483 | 10/1998 |

OTHER PUBLICATIONS

Office Action issued Jul. 25, 2008 by the Patent Office of the People's Republic of China in Application No. 2005100732250 (with English translation).

Lee, et al., "Variable Time-Scale Modification of Speech Using Transient Information", 1997 IEEE pp. 1319-1322.

* cited by examiner

FIG.4 (A) | Audio Frame 1 | Audio Frame 2 | Audio Frame 3 | Audio Frame 4 | Audio Frame 5 | Audio Frame 6 | Audio Frame 7 | Audio Frame 8 | ...

FIG.4 (B) | Audio Frame 1 | Audio Frame 2 | | Audio Frame 4 | Audio Frame 5 | | Audio Frame 7 | Audio Frame 8 | ...

FIG.4 (C) | Audio Frame 1 | Audio Frame 2 | Audio Frame 3 | Audio Frame 4 | Audio Frame 5 | Audio Frame 6 | Audio Frame 7 | Audio Frame 8 | ...

FIG.4 (D) | Audio Frame 1 | Audio Frame 2 | Audio Frame 3 | Audio Frame 4 | Audio Frame 5 | Audio Frame 6 | Audio Frame 7 | Audio Frame 8 | ...

FIG.4 (E) | Audio Frame 1 | Audio Frame 2 | Audio Frame 3 | Audio Frame 4 | Audio Frame 5 | Audio Frame 6 | Audio Frame 7 | Audio Frame 8 | ...

FIG.4 (F) | Audio Frame 1 | Audio Frame 2 | Audio Frame 3 | Audio Frame 4 | Audio Frame 5 | Audio Frame 6 | Audio Frame 7 | ...

FIG.4 (G) | Audio Frame 1 | Audio Frame 2 | Audio Frame 3 | Audio Frame 4 | Audio Frame 5 | Audio Frame 6 | ...

DIGITAL INFORMATION REPRODUCING APPARATUS AND METHOD

This application claims the benefit of Japanese Application No. 2004-162710 filed in Japan on Jun. 1, 2004, the disclosure of which also is entirely incorporated herein by reference.

TECHNICAL FIELD

The techniques disclosed herein relate to digital information recording apparatus and methods. In particular, the techniques relate to a digital information reproducing apparatus capable of appropriate audio reproduction from encoded audio signal during special playback.

BACKGROUND

In the case of encoded audio data recorded on a recording medium such as a hard disk, it is possible during special playback to reproduce and output the audio data at a tempo differing from the original one during normal playback. For example, if the viewer cannot clearly understand what is done/spoken in a TV program where persons spoke quickly or in a foreign language, the slow playback capability allows the viewer to view and listen to the program more slowly by lowering the tempo of playing back the program.

To realize a desired speed, however, it is inevitable for the sound quality to deteriorate since the original data must be processed. Thus, it is necessary to work out the control method capable of improving the sound quality. For example, JP2002-278597 discloses a technique for improving the quality of sound output at double speed playback.

SUMMARY

In the prior art, one audio frame is decoded/output for every two audio frames to output sound at double the normal speed and the least mean square method is used to improve the sound quality by smoothing the output level discontinuities between decoded data.

However, the prior art technique cannot improve the sound quality when the program is played back at another faster speed or a speed slower than the normal speed. In addition, although decoding one audio frame at fixed intervals of one audio frame and correcting the output level discontinuities is effective for contents such as news where slow speaking is dominant, this method is not so effective for contents like variety shows and dramas which include quick speaking. The present techniques address the above problem. It is an objective of the present techniques to provide a digital recording and reproducing apparatus capable of not only reproducing sound in various special playbacks including double speed playback but also always reproducing high quality sound in special playbacks regardless of what content is played back.

To achieve the above-mentioned objective, a digital recording and reproducing apparatus of the present techniques gives an offset to time information which is used when reproduction is performed on a data stream, and decodes the data stream in such a manner that a speed of reproduction from the data stream is varied based on the time information given the offset.

Skip/repeat control is periodically done to repeat/skip part of one audio frame when audio data is decoded and output in special playback. To realize good audio output, correction is made so as to emphasize the output levels of high frequency components. In addition, the skip/repeat control and output level correcting methods are changed according to characteristics of the audio data to be reproduced. Also this realizes good audio output.

According to the present techniques, it is possible to realize good audio output during special playback.

BRIEF DESCRIPTION OF THE DRAWINGS

The drawing figures depict one or more implementations in accord with the present teachings, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The following description of implementation is given with reference to an example of an apparatus which records and reproduces a MPEG (Moving Picture Experts Group) 2 transport stream (hereinafter abbreviated as MPEG2-TS) for digital broadcasting transmission. Note that the embodiment below is provided as an example to describe the present technique and does not limit the scope of the present technique to this variation. The present technique is also applicable to other various digital recording and reproducing apparatus and digital information reproducing apparatus and to other digital signal formats for audio or programs that include audio.

Firstly, characteristics of the MPEG2-TS are described. The MPEG2 scheme provides for a data format suitable for digital recording and reproduction. For video, the encoded picture data structure has what are called I, P and B pictures. One edit unit called a GOP (Group of Pictures) is composed of a plurality of pictures (for example, fifteen pictures are typically organized into one GOP for a TV broadcast).

For the I picture, intra-frame coding is used, that is, content is encoded fully within the frame. I pictures can directly be decoded. For the P picture, forward inter-picture prediction coding is done using an I picture. To decode P pictures, I pictures are required. For the B picture, coding is done based on bidirectional prediction using the preceding and subsequent I or P pictures.

One GOP contains at least one I picture, allowing random access to each GOP.

PES (Packetized Elementary Stream) packets are data packets organized on a per medium basis. Video, audio and other data are respectively divided and organized into fixed-length PES packets. The video PES packets, audio PES packets and data PES packets are multimedia-multiplexed into an MEPG2-TS (Transport Stream).

In addition, system references called PCRs (Program Clock References) are embedded in the MPEG2-TS before transmission so that the stream operates on the reception side as intended by the transmission side. Likewise, PTSs (Presentation Time Stamps)—time management information to be referred to during reproduction, DTSs (Decoding Time Stamps)—time management information to be referred to during decoding, and other data are embedded in the header information of the one or more of PES streams to be transmitted.

<Ordinary Reproduction Procedure>

Figure 1:
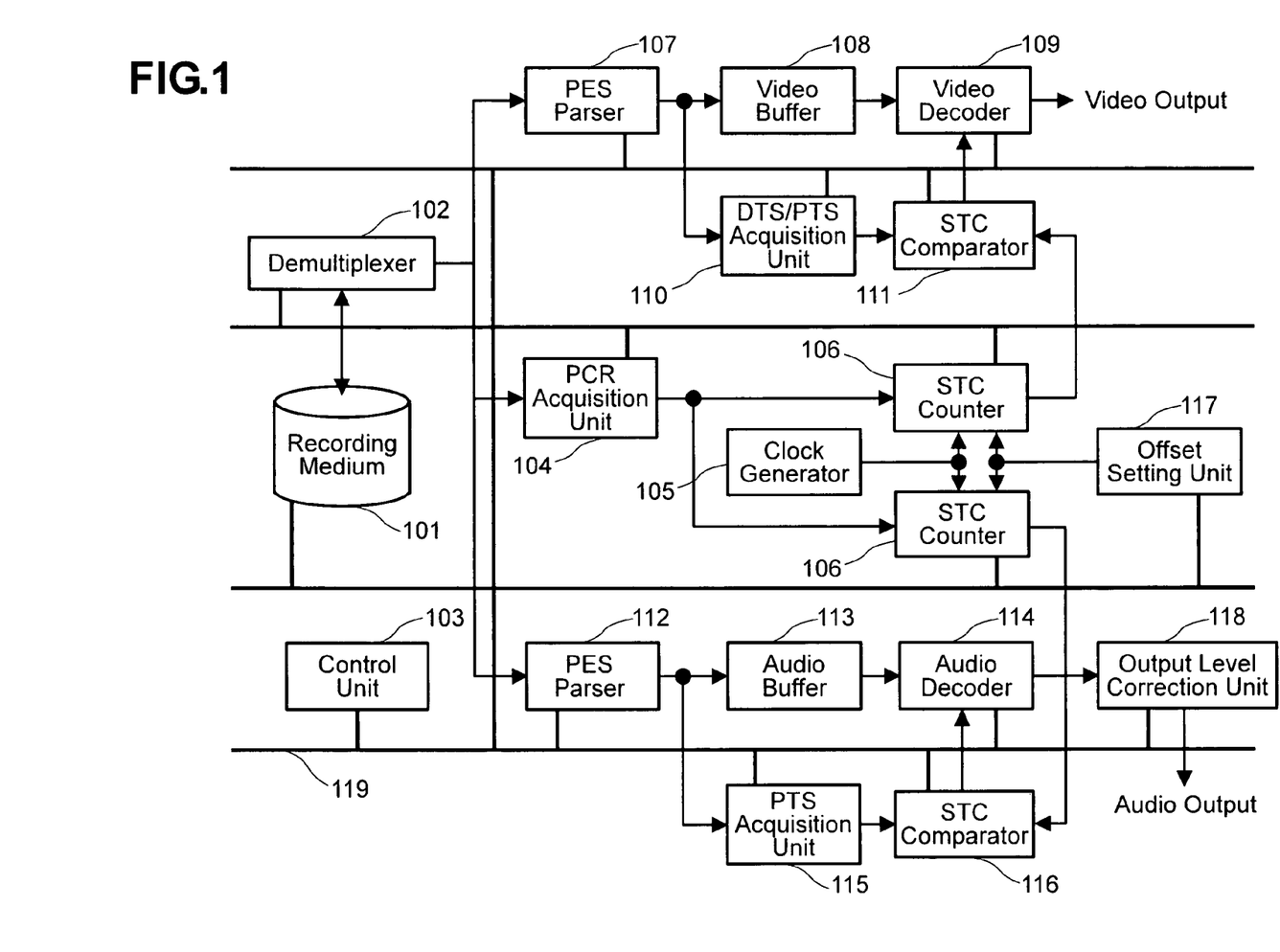
FIG. 1 is a block diagram showing the configuration of a video/audio reproducing apparatus according to an embodiment of the present techniques.

FIG. 1 is a block diagram showing the configuration of a recording and reproducing apparatus according to an embodiment. This digital recording and reproducing apparatus includes a recording medium 101, a demultiplexer 102, a control unit 103, a PCR acquisition unit 104, a clock generator 105, two STC (System Time Clock) counters 106, a video PES parser 107, a video buffer 108, a video decoder 109, a DTS/PTS acquisition unit 110, an STC comparator 111, an audio PES parser 112, an audio buffer 113, an audio decoder 114, a PTS acquisition unit 115, a STC comparator 116, an offset setting unit 117, an output level correction unit 118 and a system bus 119. In this embodiment, it is assumed that signals in the MPEG2-TS format described above have been received from an input port not shown in FIG. 1 and recorded into the recording medium 101, representatively a hard disk drive.

An arbitrary data stream in the MPEG2-TS format, selected by the user from the recorded data, is retrieved and sent out to the demultiplexer 102 by the recording medium 101.

In the stream sent out from the recording medium 101, video PES, audio PES, PCR data and other data are intermingled. The demultiplexer 102 separates them and supplies the Video PES to the video PES parser 107, the audio PES to the audio PES parser 112 and the PCR data to the PCR acquisition unit 104. The control unit 103 controls processing in each internal unit of the reproducing apparatus via the system bus 119.

If a PCR value in the PCR data supplied from the demultiplexer 102 is different from the STC counter value of the STC counter 106, the control unit 103 sets the PCR value into the STC counters 106.

The clock generator 105 oscillates and supplies a clock signal which is needed for the STC counters 106 to increment the STC counter value in synchronization therewith.

The STC counter 106 sets thereto a PCR value supplied from the PCR acquisition unit, and since then, increments the STC counter value in synchronization with the local clock signal supplied from the clock generator 105. As necessary, the set STC counter value is supplied to the STC comparator 111 associated with the video decoder and to the STC comparator 116 associated with the audio decoder.

The video parser 107 parses the video PES supplied from the demultiplexer 102 and separates it into video data and time information DTS/PTS. The separated video data is sent to the video buffer 108 for video reproduction whereas the time information is sent to the DTS/PTS acquisition unit 110.

The video buffer 108 is a buffering storage device to receive the video data supplied from the video PES parser 107 and get the timing of outputting it to the video decoder 109 in synchronization with the time information.

Upon notification of DTS-STC agreement from the STC comparator 111, the video decoder 109 acquires a video PES packet corresponding to the time information from the video buffer 108 and decodes it. In addition, upon notification of PTS-STC agreement, the video decoder 109 outputs the decoded video PES packet as video.

Acquiring the PTS and DTS which are separated from each video PES packet by the PES parser 107, the DTS/PTS acquiring unit 110 outputs them to the STC comparator 111 associated with the video decoder.

The STC comparator 111 associated with the video decoder compares the STC counter value supplied from the STC counter 106 and the DTS value acquired from the DTS/PTS acquiring unit 110. If these values agree with each other, the STC comparator 111 notifies the video decoder 109 of the agreement. Likewise, the STC comparator 111 compares the PTS value acquired from the DTS/PTS acquisition unit 110 and the STC counter value and, if they agree with each other, notifies the video coder 109 of the agreement.

The audio PES parser 112 parses the audio PES supplied from the demultiplexer 102 and separates it into audio data and time information PTS. The audio data is sent to the audio buffer 113 whereas the PTS data is sent to the PTS extracting unit 115.

The audio buffer 113 is a buffering storage device to receive the audio data supplied from the audio PES parser 112 and get the timing of outputting it to the audio decoder 114 in synchronization with the time information.

Upon notification from the STC comparator 116 that the STC counter value agrees with the PTS, the audio decoder 114 takes in audio data from the audio buffer 113, decodes it and outputs the decoded audio data to the output level correction unit 118.

The PTS acquisition unit 115 extracts the PTS value sent from the audio PES parser 112 and outputs it to the STC comparator 116 associated with the audio decoder.

The STC comparator 116 associated with the audio decoder compares the PTS extracted by the PTS acquisition unit 115 and the STC counter value supplied from the STC counter 106. If the STC counter value agrees with the PTS, the STC comparator 116 notifies the audio decoder 114 of the agreement.

During special reproduction, the offset setting unit 117 gives an offset to the STC counter value generated by the STC counter 106. The offset is set according to a requested speed as described later in detail.

Figure 2:
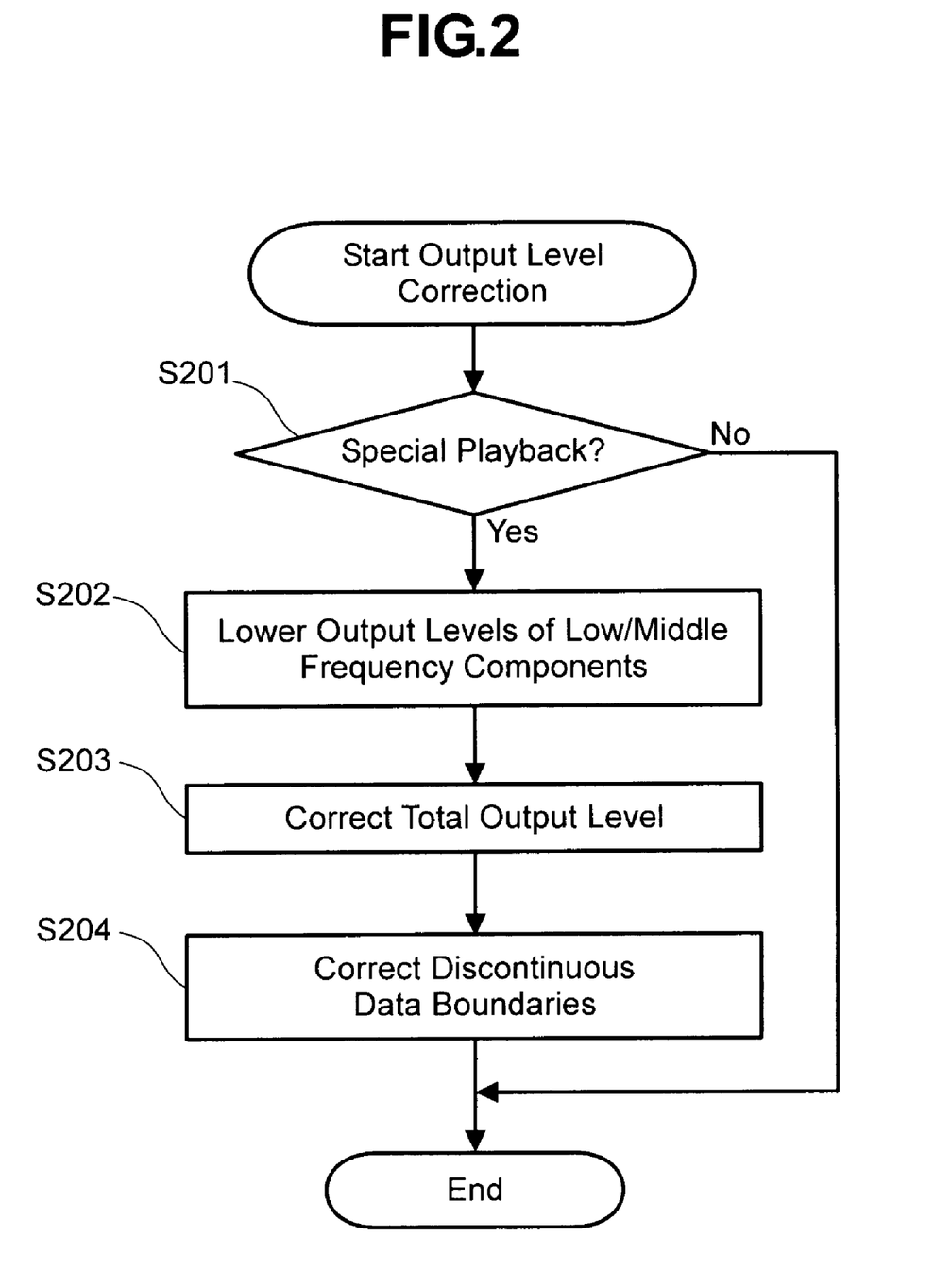
FIG. 2 is a flowchart of output level correcting operation in the embodiment of the present technique.

The output level correction unit 118 functions as shown in a flowchart of FIG. 2.

According to the procedure mentioned above, this digital recording and reproducing apparatus of the embodiment performs normal reproduction and synchronously outputs video and audio from the recording medium 101.

While the offset setting unit 117 changes the decode and output timings by giving an offset to the STC counter 106 in this embodiment, it is also possible for the offset setting unit 117 to provide the same effect by giving PTS and DTS offsets to the DTS/PTS acquisition unit 110 and the PTS acquisition unit 115.

<Special Reproduction Method>

Reproduction from the recording medium allows the user during normal playback to execute special playback, such as fast forward playback, backward playback, pause or slow playback by operating buttons on the remote controller of the apparatus.

Figure 3:
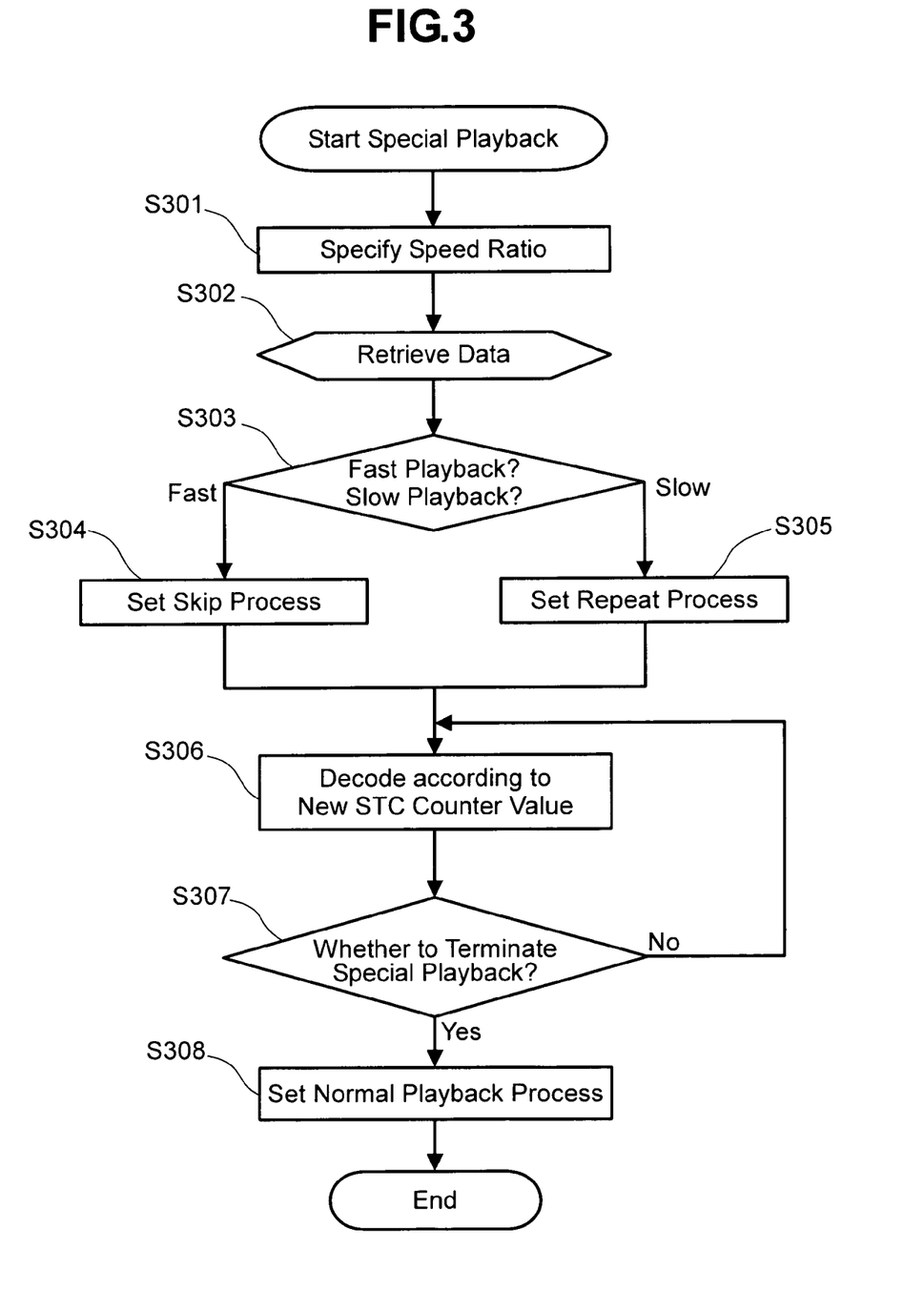
FIG. 3 is a flowchart of operation during special playback in the embodiment of the present technique.

FIG. 3 is a flowchart showing how audio reproduction is done when special playback is executed.

In S301, the ratio of the special playback speed to the normal playback speed is specified. In Step 303 described below, the special playback is judged slow playback if this ratio is smaller than 1.0 and fast playback if the ratio is larger than 1.0.

In S302, video/audio data is read out from the recording medium 101 along the same data flows as described earlier.

In S303, it is judged whether the type of the special playback is fast playback or slow playback. If the type is judged as fast playback, control goes to S304. If slow playback, control goes to S305.

In S304, control setting is done in the offset setting unit 117 for skip reproduction of audio data. Skip reproduction halts decoding an audio frame and resumes decoding from the subsequent audio frame. For this process, an offset is given to the STC counter value for, e.g., each audio frame or every several audio frames in consistence with the speed ratio specified in S301. If the speed ratio is, e.g., 1.5, the offset is set so as to make the increase of the STC counter value equal to 1.5 times the rate during normal playback.

In S305, control setting is done in the offset setting unit 117 for repeat reproduction of audio data. In repeat reproduction, an audio frame is decoded more than once from its top part by the audio decoder 114. For this process, an offset is given to the STC counter value for, e.g., each audio frame or several audio frames in consistence with the speed ratio specified in S301. If the speed ratio is, e.g., 0.75, the offset is set so as to reduce the rate of the STC counter value to 75% of the rate during normal playback.

According to the STC counter value given an offset from the offset setting unit 117 based on the setting done in S304 or S305, audio data is decoded in S306.

In S307, it is judged whether the special playback is terminated. To continue the special playback, control goes back to S305. If it is determined to terminate the special playback, control goes to S308. In S308, the special playback is terminated by exiting the routine after restoring the offset setting unit 117 and control unit 103 to normal playback.

Figure 4:
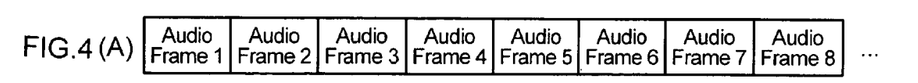
FIG. 4(A) shows a scheme for reproducing audio frames from an audio PES in the embodiment, and audio frames which are decoded/output in normal playback.
FIG. 4(B) shows an example of audio frame sequences which are decoded/output in 1.5 speed ratio playback.
FIG. 4(C) shows another example of audio frame sequences which are decoded/output in 1.5 speed ratio playback.
FIG. 4(D) shows another example of audio frame sequences which are decoded/output in 1.5 speed ratio playback.
FIG. 4(E) shows another example of audio frame sequences which are decoded/output in 1.5 speed ratio playback.
FIG. 4(F) shows an example of audio frame sequences which are decoded/output in 0.75 speed ratio playback.
FIG. 4(G) shows another example of audio frame sequences which are decoded/output in 0.75 speed ratio playback.

The skip/repeat technique for audio data can be designed flexibly as described below with examples. FIGS. 4(A) through 4(G) schematically show how the output of audio data changes depending on the skip/repeat scheme in 1.5 speed ratio and 0.75 speed ratio special playback modes. In FIG. 4(A), a flow of audio data frames decoded/output in normal playback is shown as an example. Shown in FIGS. 4(B) to 4(E) are those in 1.5 speed ratio playback. Shown in FIGS. 4(F) and 4(G) are those in 0.75 speed ratio playback. For comparison with normal playback, FIGS. 4(B), 4(C), 4(F) and 4(G) are respectively shown together with the original audio stream from FIG. 4(A).

As an example of fast playback, firstly a description is made of how audio data is reproduced during 1.5 speed ratio playback. If the playback speed ratio is 1.5, it is necessary to skip one third of the total data. Hence, an offset is given to the STC counter value so as to reduce the audio PES data to two thirds (=1/1.5). In FIG. 4(B), audio frames 1 and 2 are processed like in FIG. 4(A) but audio frame 3 is skipped. That is, the audio data is skipped at a fixed rate of one frame every three frames. In the case of FIG. 4(C), all audio frames shown in FIG. 4(A) are partly skipped. That is, a third of every frame is skipped. Either FIGS. 4(B) or 4(C) reduces the amount of data by a third.

Not limited to the above examples, various control methods are available since what is required is only to edit data in consistency with the requested speed ratio. In FIG. 4(D), after one frame is normally decoded, part of each of the subsequent two frames, shown by a broken line, is skipped. In FIG. 4(E), after two frames are normally decoded, part of each of the subsequent four frames, shown by a broken line, is skipped. In the latter case, skip control is repeated at intervals of as many as six frames to realize reproduction in 1.5 speed ratio playback.

However, when choosing one method from the above ones and many other control methods, its practicability must be considered since it may cause bad lip synchronization perceptible to the viewer. The audio output timing relative to the corresponding video output timing should be within a range between an advance of 23 ms and a delay of 56 ms at any time.

On the other hand, the following describes how audio is reproduced during 0.75 speed ratio playback as an example of slow playback. In this case, the amount of audio PES data to be decoded is increased to four thirds (=1/0.75) by giving an offset to the STC counter value so as to repeat some part. For example, in FIG. 4F, audio frames 1 through 3 are normally processed but audio frame 4 highlighted by a solid quadrilateral is processed repeatedly in FIG. 4(F). That is, repeated data output is performed at a fixed rate of one frame every four frames. The same effect can also be obtained by repeating the first fourth of each frame as shown in FIG. 4(G). Either FIGS. 4(F) and 4(G) outputs the same amount of data in total. Not limited to these two methods, various repeating variations can be employed for 0.75 speed ratio playback as well.

In addition, while the speed ratio in fast/slow playback is assumed to be 1.5/0.75 in the above discussion, the same holds for other special playback speeds as well.

Figure 7:
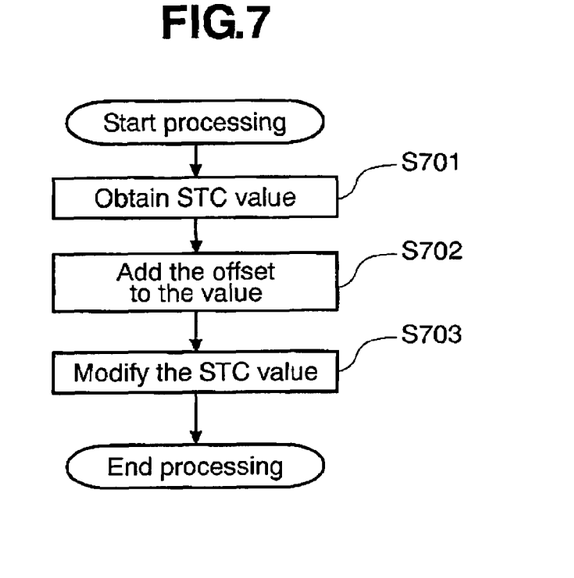
FIG. 7 is a flowchart of operation to obtain modified time information.

FIG. 7 is a flowchart showing how the offset is added to the STC counter value by the offset setting unit 117. First in S701, the offset setting unit 117 obtains the STC value from the STC counters 106. Second in S702 the offset setting unit 117 adds the offset based on the timing of the event e.g., synchronizing timing for displaying video data, or start or end timing of decoding video data, which occurs constantly in the hardware. Next in 703 the STC value in the STC counter 106 are renewed by the offset in S702.

Figure 8:
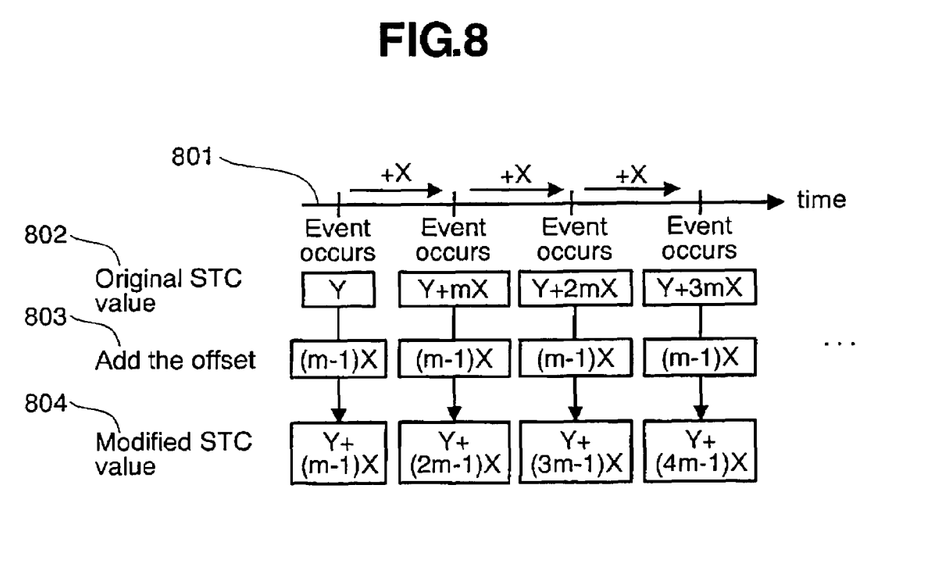
FIG. 8 shows how to add an offset to time information.

FIG. 8 explains addition of the offset to the STC counter 106 for m (m is integer or decimal larger than 1) speed ratio playback in the offset setting unit 117. Usually the value increases with time passing. The event occurs every STC value X (801). The event triggers to modify the STC value which is obtained from STC counters 106 (802). The (m−1)X value which is (m−1) times of the event occurring period is added to the original STC value (803, 804). When the STC value gets up to further X value again, then (m−1)X value is added to the original value. Then renewed STC value can be obtained every predetermined period. By repeating the operation renewed STC for m speed ratio playback can be obtained.

Similarly 1/n (n is integer, and 1/n is smaller than 1) ratio speed playback is realized. Every time the original STC value increases X, (1−1/n)X are subtracted from the original value. Then reduced STC value can be obtained. By repeating the operation every X value, 1/n speed ratio playback can be realized.

Timing of decoding and displaying synchronizes to the STC counter 106. Therefore by repeating to renew the STC value, decoding and displaying are performed based on the renewal STC value. Displayed image can be skipped or repeated by the renewed STC value.

The operation explained above relative to FIGS. 7 and 8 that may be implanted is the process by the software running on a control unit 103 and a processor serving as the offset setting unit 117, but the same process can be realized by hardware.

<Correcting Output Level>

FIG. 2 is a flowchart showing the operations executed by the output level correction unit 118 in FIG. 1. Audio data, after being decoded as mentioned above, is sent to the correction unit 118. Since the audio output is discontinuous when skip/repeat is started and terminated, the sound quality becomes unnatural. Accordingly, the output level correction unit 118 is designed to improve the sound quality. The output level correction unit 118 has a digital processing section and a D/A converter. The digital processing section is controlled by controller 103. Various software can be applied to the output level correction unit to process the signal digitally. The processed signal is converted to an analog signal and outputted via speakers (not shown)

In S201, it is judged whether special playback is ongoing. In the case of normal playback, the routine is terminated without executing correction. If the current playback is special playback, transition occurs to S202. From S202 to S204, a series of settings are done for the correction.

In S202, correction of the output level is done in frequency domain. In the case of the special playback for the skip/repeat of audio data, for example, speech has a frequency band ranging from about 400 to 3000 Hz. To make the output speech more audible, correction is made so as to suppress the output level of lower-than-400 Hz frequency components and emphasize the output level of higher-than-400 Hz frequency components.

Correction in S202 lowers the total audio output level as a byproduct of correction. To prevent the output speech from weakening, correction in S203 boosts the total audio volume by uniformly raising the levels of all frequency components.

In S204, correction is performed on data boundaries which occur where skip/repeat is done. Such boundaries make the audio output level discontinuous, resulting in unnatural speech heard. To smooth the discontinuities of audio data, the output data level is corrected by a linear interpolation technique such as the least mean square method. To make the discontinuities less recognizable, fade-in and fade-out processing is performed.

Note that it is not necessary to follow the above-mentioned procedure regardless of which of the plural techniques are used. Substantially the same effect can also be obtained by either performing these steps in a different order or concurrently performing these steps.

<Changing Control According to Content>

The following describes how the skip/repeat control scheme is changed according to the detected audio characteristics of the content to be reproduced.

Figure 5A:
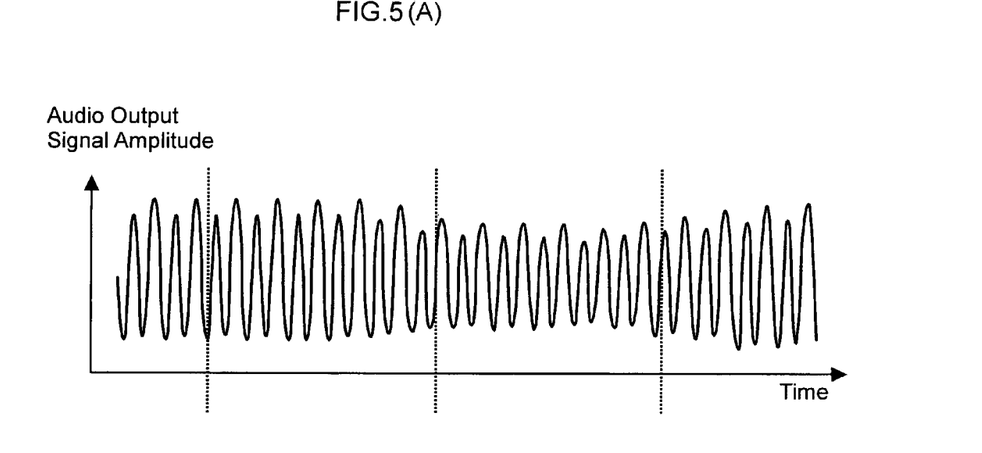
FIG. 5(A) schematically shows how the audio output level changes during normal playback in the embodiment of the present technique.
Figure 5B:
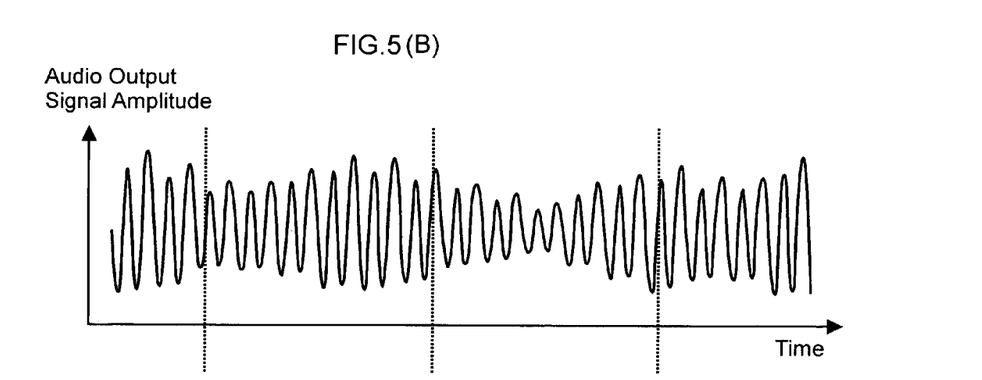
FIG. 5(B) schematically shows how the audio output level changes during normal playback in the embodiment of the present technique.

FIGS. 5(A) and 5(B) schematically show how the audio output level changes during normal playback for two different kinds of content. The horizontal axis represents the time whereas the vertical axis represents the audio output level. As the vertical amplitude increases, the output sound volume becomes larger. Each broken line indicates a boundary between audio frames.

In FIG. 5(A), the audio output level does not frequently change due to the nature of the content (e.g., a news program). In this case, long skips can therefore be done in, e.g., 1.5 speed ratio playback without causing the viewer to hear something abnormal. Accordingly, enlarging the skip length to, e.g., one frame as in FIG. 4(B) raises the processing efficiency.

To the contrary, the audio output level changes frequently in FIG. 5(B) due to the nature of the content (e.g., a variety program). Long skips make the output level discontinuities more perceptible. In this case, it is possible to improve the sound quality by frequently performing a short skip as in FIG. 4(C).

In digital broadcast, not only video and audio but also various program data/information are multiplexed for transmission. For example, there is included a data item called program genre. On the assumption that the genre is compatible with the speaking tempo of persons in the program, the control scheme may be changed depending on the genre name. Generally, persons in a variety program speak at a faster tempo than announcers in a news program who intend to speak clearly. Therefore, in the former case, since such a waveform as shown in FIG. 5(B) may be dominant, the control is set so as to frequently perform fine correction as shown in FIG. 4(C).

As well, the scheme for correcting the output levels of frequency components is also changed. In one case, the offset given so as to increase or decrease the output level is changed according to the program information. In another case, the frequency band whose output level is to be increased/decreased in the correction unit 118 is changed according to the program information. For example, if a short skip is frequently performed, sufficient effect can be obtained without greatly suppressing low frequency components.

Figure 6:
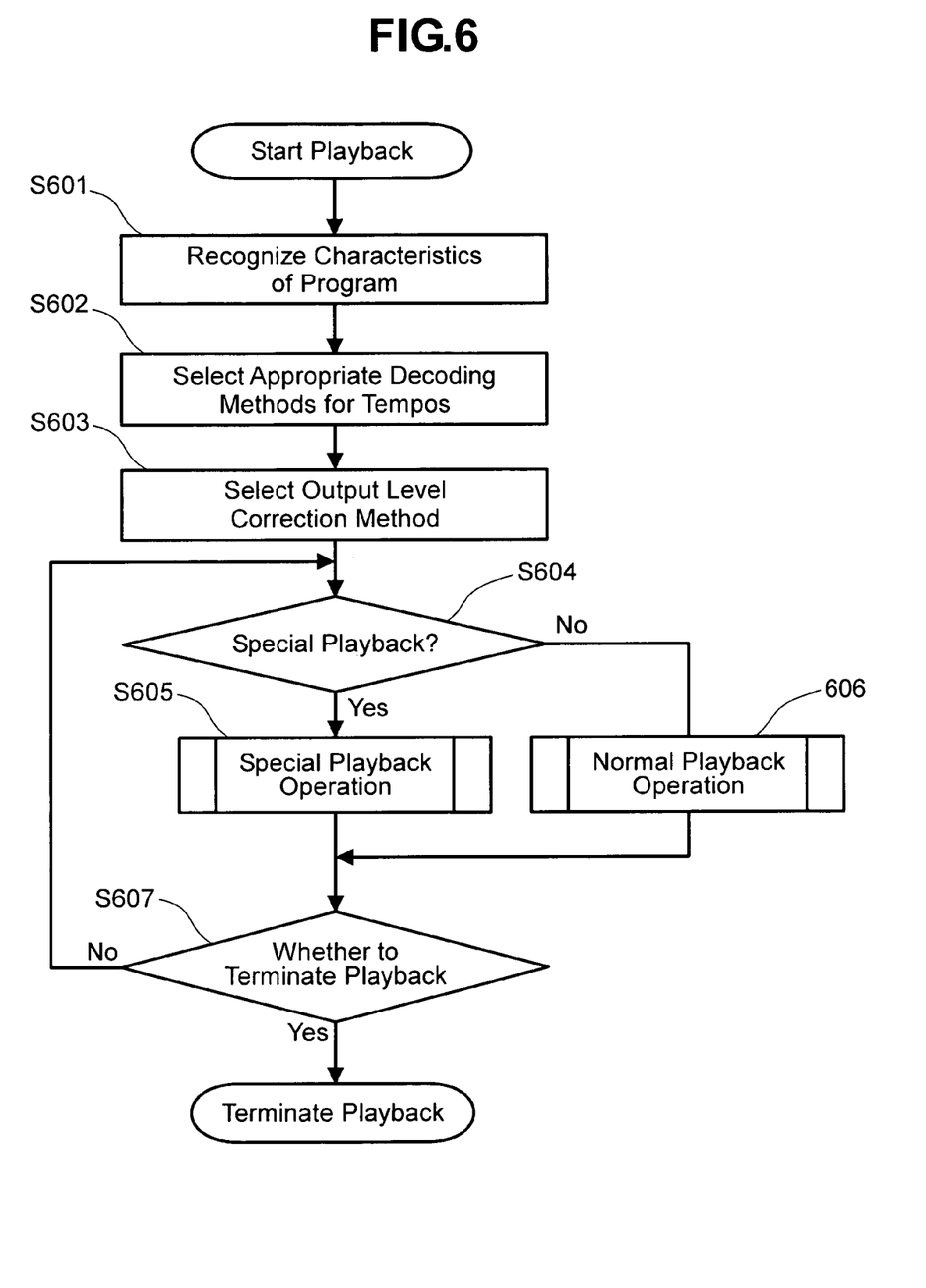
FIG. 6 is a flowchart of operation to recognize characteristics of the content to be reproduced in the embodiment of the present technique.

FIG. 6 is a flowchart showing how the processing by the output level correction unit 118 is changed according to characteristics of the audio to be reproduced. If playback is started, in S601, the genre of the content to be reproduced is immediately recognized. In FIG. 1, the demultiplexer 102 obtains program information from the reproduced data stream, and the control unit 103 analyzes the obtained program information and notifies the offset setting unit 117 and the output level correction unit 118 of the genre. It is also possible for the control unit 103 to obtain the program information form the recorded data in recording medium 101.

In S602, the offset setting unit 117 preliminarily determines a control scheme for each genre. The control scheme to be used in special playback is changed as necessary.

Likewise, in S603, the output level correction unit 118 sets the control scheme in consistence with the genre. Then, in S604, it is repeatedly judged whether special playback is started until playback is stopped. If the current playback is special playback, transition occurs to S605 where a special playback procedure is executed as described with FIG. 3. If normal, transition occurs to S606 where a normal playback procedure is executed likewise. If it is judged to terminate the playback in S607, the routine is exited. If judged to continue the playback, loop back occurs to S604.

As mentioned above, it is possible to improve the sound quality by changing the processing scheme according to the content. Also note that while only the program genre is used above to recognize characteristics of the content, it is also effective to combine various information sent as part of the stream and use the combined information in recognizing the characteristics.

While the embodiment has so far been described on the assumption that the content is recorded in MPEG2-TS, the same effect can be obtained by the aforementioned procedures even if the content is recorded in other digital formats (e.g., MPEG2-PS). In the case of a content recorded in MPEG2-PS, it is necessary to replace PCR with SCR (System Clock Reference) in reading the above description.

In addition, while the embodiment has so far been described on the assumption that a broadcast stream is recorded and reproduced, the present technique is applicable to any system capable of packetizing and digitally recording video and audio and reproducing the video and audio in special playback mode by adding an offset to the time information. For example, application may be possible to family-use cassette/DVD camcorders and monitoring camera systems.

Operations described above may be carried out by execution of software, firmware, or microcode operating on a processor based digital information reproducer or on a computer of any type. Additionally, code for implementing such operations may be in the form of computer instruction in any form (e.g. source code, object code, interpreted code, etc.) stored in or carried by any computer or machine readable medium.

Program aspects of the technology may be thought of a "products," typically in the form of executable code and/or associated data that is carried on or embodied in a type of machine readable medium. The executable code and/or associated data controls the operation of the broadcast receiver, recorder, computer or other programmable device for implementing the recording, playback or program guide functions. Media include any or all of the memory of the broadcast receiver or associated modules thereof, such as various semi-conductor memories, tape drives, disk drives and the like, which may provide storage at any time for the software programming. All or portions of the software may at times be communicated through the Internet or various other telecommunication networks. Such communications, for example, may enable loading of the software from another computer (not shown) into the broadcast receiver or recorder or into another element, such as a web server used for software distribution or distribution of broadcast related information. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software.

Terms regarding computer or machine "readable medium" (or media) as used herein therefore relate to any physical medium or transmission medium that participates in providing instructions or code or data to a processor for execution or processing. Such a medium may take many forms, including but not limited to, non-volatile media and volatile media as well as carrier wave and physical transmission media.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A digital information reproducing apparatus for reproducing an encoded audio data stream, comprising:
   an offset unit for generating an offset with respect to time information which reproduces the data stream;
   a decoder for decoding, by skipping or repeating select data of a stream which is smaller than one audio frame of data, so as to decode a data stream which is smaller than one audio frame of data during special playback based on the time information and for varying playback speed of the data stream based on the offset; and
   an output device for outputting an audio signal decoded by the decoder.

2. A digital information reproducing apparatus according to claim 1, wherein the offset unit adds an offset to a STC (system time clock) counter value which serves as a time reference for the decoder.

3. A digital information reproducing apparatus according to claim 1, further comprising a time information acquisition unit for acquiring said time information from the data stream.

4. A digital information reproducing apparatus according to claim 1, wherein the output device includes a level corrector for correcting output level of the decoder according to audio information.

5. A digital information reproducing apparatus according to claim 4, wherein the level corrector emphasizes an audio output level of high frequencies beyond a predefined frequency when reproduction is performed by the decoder at a varied playback speed.

6. A digital information reproducing apparatus according to claim 4, wherein the level corrector emphasizes an audio output level of low frequencies below a predefined frequency when reproduction is performed by the decoder at a varied playback speed.

7. A digital information reproducing apparatus according to claim 4, wherein program-related information is added in the data stream;
   the apparatus further comprising:
   a program-related information acquisition unit for acquiring the program-related information;
   wherein the offset unit changes a magnitude of the level corrector based on the program-related information acquired by the program-related information acquisition unit.

8. A digital information reproducing apparatus according to claim 1, wherein program-related information is added in the data stream;

the apparatus further comprising:
a program-related information acquisition unit for acquiring the program-related information;
wherein the offset unit changes a magnitude of the offset based on the program-related information acquired by the program-related information acquisition unit.

9. A digital information reproducing apparatus according to claim 1, wherein:
the data stream is audio data which is broadcast as a broadcast stream in the TS format according to the MPEG standard;
the apparatus further comprising:
a demultiplexer which separates desired audio data and video data from the broadcast stream data; and
a recorder for recording the audio data and video data separated by the demultiplexer.

10. A digital information reproducing method for reproducing audio data from an encoded data stream, comprising the steps of
modifying time information which is for decoding or reproducing data stream with an offset;
during special playback, skipping or repeating select data of a stream which is smaller than one audio frame of data so as to decode a data stream, which is smaller than one audio frame of data, and varying playback speed of the data stream based on the modified time information; and
outputting the decoded audio signal.

11. A digital information reproducing apparatus for reproducing an encoded audio data stream, comprising:
a time information acquisition unit for acquiring time information from the encoded audio data stream, for use in decoding the encoded audio data stream during reproducing;
an offset unit for generating an offset with respect to the time information, the offset corresponding to a timing characteristic of a special playback operation;
a system time clock (STC) counter for counting a value for use as a time reference for the decoding of the audio data stream, wherein the offset is added to the counter value during the special playback operation;
a comparator for comparing the time information acquired from the encoded audio data stream to the STC counter value to which the offset value has been added during the special playback operation;
an audio decoder for decoding the audio data stream based on the time information and responsive to the comparator, by skipping or repeating a select portion of frame audio data so as to decode a portion of frame audio data smaller than one audio frame of the data stream during the special playback operation, to vary playback speed of the audio data stream based on the offset; and
an output device for outputting an audio signal decoded by the decoder.

12. A digital information reproducing apparatus according to claim 11, wherein the output device includes a level corrector for correcting output level of the decoder according to audio information.

13. A digital information reproducing apparatus according to claim 12, wherein the level corrector emphasizes an audio output level of high frequencies beyond a predefined frequency when reproduction is performed by the decoder at a varied playback speed.

14. A digital information reproducing apparatus according to claim 12, wherein the level corrector emphasizes an audio output level of low frequencies below a predefined frequency when reproduction is performed by the decoder at a varied playback speed.

15. A digital information reproducing apparatus according to claim 12, wherein:
program-related information is added in the data stream;
the apparatus further comprises a program-related information acquisition unit for acquiring the program-related information; and
the offset unit changes a magnitude of the level corrector based on the program-related information acquired by the program-related information acquisition unit.

16. A digital information reproducing apparatus according to claim 11, wherein:
program-related information is added in the data stream;
the apparatus further comprises a program-related information acquisition unit for acquiring the program-related information; and
the offset unit changes a magnitude of the offset based on the program-related information acquired by the program-related information acquisition unit.

17. A digital information reproducing apparatus according to claim 11, wherein:
the encoded audio data stream is audio data which is broadcast as a broadcast stream in the TS format according to the MPEG standard; and
the apparatus further comprises:
a demultiplexer which separates desired audio data and video data from the broadcast stream data; and
a recorder for recording the audio data and video data separated by the demultiplexer.

* * * * *